US012579226B2

(12) United States Patent
La Placa

(10) Patent No.: US 12,579,226 B2
(45) Date of Patent: Mar. 17, 2026

(54) PLATFORM FOR DIGITALLY TWINNING SUBJECTS INTO AI AGENTS

(71) Applicant: Intellectus Partners, LLC, San Francisco, CA (US)

(72) Inventor: David J La Placa, San Francisco, CA (US)

(73) Assignee: INTELLECTUS PARTNERS, LLC, San Francisco, CA (US)

( * ) Notice: Subject to any disclaimer, the term of this patent is extended or adjusted under 35 U.S.C. 154(b) by 0 days.

(21) Appl. No.: 19/252,577

(22) Filed: Jun. 27, 2025

(65) Prior Publication Data

US 2025/0322044 A1 Oct. 16, 2025

Related U.S. Application Data

(63) Continuation-in-part of application No. 19/006,533, filed on Dec. 31, 2024, which is a
(Continued)

(51) Int. Cl.
*G06Q 20/00* (2012.01)
*G06F 21/10* (2013.01)
*G06N 20/00* (2019.01)

(52) U.S. Cl.
CPC ........... *G06F 21/107* (2023.08); *G06N 20/00* (2019.01)

(58) Field of Classification Search
None
See application file for complete search history.

(56) References Cited

U.S. PATENT DOCUMENTS 9,501,658 B1 * 11/2016 Gonzalez ............ G06F 21/6209
9,691,105 B2 6/2017 Thier et al.
(Continued)

OTHER PUBLICATIONS

Fuller; Digital Twin Enabling Technologies; IEEEAccess; 21 pages; 2020.*
(Continued)

*Primary Examiner* — Radu Andrei
(74) *Attorney, Agent, or Firm* — GALVIN PATENT LAW LLC; Brian R. Galvin; Alec Perry

(57) ABSTRACT

A platform for creating, managing, and deploying digital twins of human experts through automated behavioral capture and analysis. The platform employs a data collection system that monitors and processes digital interactions, communications, and work patterns to create AI-powered digital representations of subject matter experts. These digital twins maintain the knowledge, decision-making patterns, and communication style of the original subject while preserving privacy and confidentiality boundaries. The platform includes systems for managing multiple instances of digital twins across different organizations, with capabilities for instance-level learning and knowledge integration. A comprehensive licensing and rights management system enables controlled distribution of expert digital twins while ensuring appropriate privacy and security controls are in place. The platform maintains continuous compliance monitoring and privacy enforcement across all twin instances, allowing for scalable deployment of expert knowledge while maintaining security and confidentiality requirements.

15 Claims, 14 Drawing Sheets

Related U.S. Application Data continuation-in-part of application No. 18/407,415, filed on Jan. 8, 2024, now Pat. No. 12,450,570.

(56) References Cited

U.S. PATENT DOCUMENTS

| | | | |
|---|---|---|---|
| 10,007,757 B2 | 6/2018 | Tanner, Jr. et al. | |
| 10,296,729 B1* | 5/2019 | Bertsch | H04L 9/3239 |
| 10,956,690 B1* | 3/2021 | Sutton | G06K 7/10366 |
| 11,526,787 B1* | 12/2022 | Chen | G06N 3/0455 |
| 11,551,321 B1 | 1/2023 | Novati et al. | |
| 12,154,391 B2* | 11/2024 | Cella | G07C 5/0816 |
| 12,327,210 B2* | 6/2025 | Miller | G06Q 10/067 |
| 2006/0053044 A1 | 3/2006 | Kurian et al. | |
| 2009/0198728 A1 | 8/2009 | Davia et al. | |
| 2014/0149167 A1 | 5/2014 | Lo et al. | |
| 2017/0124531 A1 | 5/2017 | McCormack | |
| 2017/0357901 A1 | 12/2017 | La Placa | |
| 2020/0210939 A1 | 7/2020 | Kolodner et al. | |
| 2020/0351323 A1* | 11/2020 | Gong | H04L 65/762 |
| 2021/0073799 A1* | 3/2021 | Messina | H04L 9/50 |
| 2021/0255612 A1* | 8/2021 | Boche | G06F 16/22 |
| 2022/0160993 A1* | 5/2022 | Hsu | G09G 3/2096 |
| 2022/0261769 A1 | 8/2022 | Vellanti | |
| 2022/0341188 A1* | 10/2022 | Shi | E04F 15/02177 |
| 2023/0005495 A1* | 1/2023 | Kukde | G10L 25/51 |
| 2023/0077130 A1 | 3/2023 | Matsuoka et al. | |
| 2023/0140214 A1* | 5/2023 | Cornell, III | G06Q 40/02 705/38 |
| 2023/0161879 A1* | 5/2023 | Koo | G06F 21/554 726/23 |
| 2023/0230293 A1* | 7/2023 | Kaplan | G06F 3/011 345/156 |
| 2023/0252101 A1* | 8/2023 | Choo | G06F 16/9558 707/709 |
| 2023/0328104 A1* | 10/2023 | Ghosh | H04W 4/021 726/23 |
| 2023/0360802 A1* | 11/2023 | Jin | G16H 50/70 |
| 2023/0409754 A1* | 12/2023 | Ugolini | G06F 21/64 |
| 2024/0020423 A1* | 1/2024 | Ylinen | G06F 21/64 |
| 2024/0330544 A1* | 10/2024 | Furlong | G06F 30/27 |
| 2024/0370833 A1 | 11/2024 | Smith et al. | |
| 2024/0404530 A1* | 12/2024 | Meagher | G10L 17/26 |
| 2025/0085935 A1* | 3/2025 | Ketharaju | G06N 20/00 |
| 2025/0301328 A1* | 9/2025 | Abbaszadeh | H04L 41/145 |

OTHER PUBLICATIONS

Rathore; The_Role_of_AI_Machine_Learning_in_Digital_Twinning; IEEEAccess; pp. 32030-32052.*

Schultes; FAIR Digital Twins; Frontiers of Big Data; 2020; 19 pages.*

Yamin; Towards_a_Digital_Twin_for_Lifelong_Learning; IEEE, Gjovik University; 6 pages; 2023.*

* cited by examiner

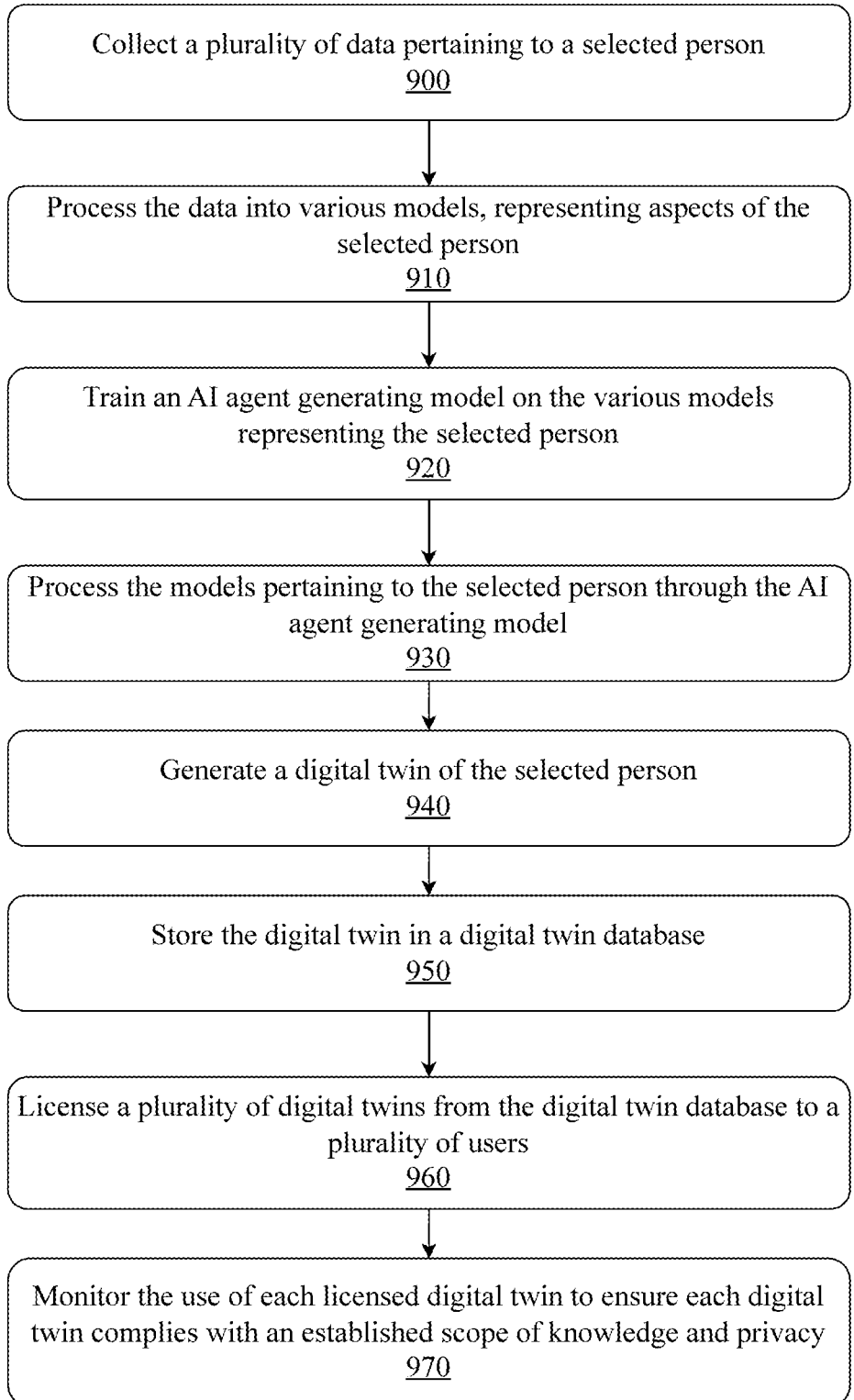

Collect a plurality of data pertaining to a selected person
900

Process the data into various models, representing aspects of the selected person
910

Train an AI agent generating model on the various models representing the selected person
920

Process the models pertaining to the selected person through the AI agent generating model
930

Generate a digital twin of the selected person
940

Store the digital twin in a digital twin database
950

License a plurality of digital twins from the digital twin database to a plurality of users
960

Monitor the use of each licensed digital twin to ensure each digital twin complies with an established scope of knowledge and privacy
970

FIG. 9

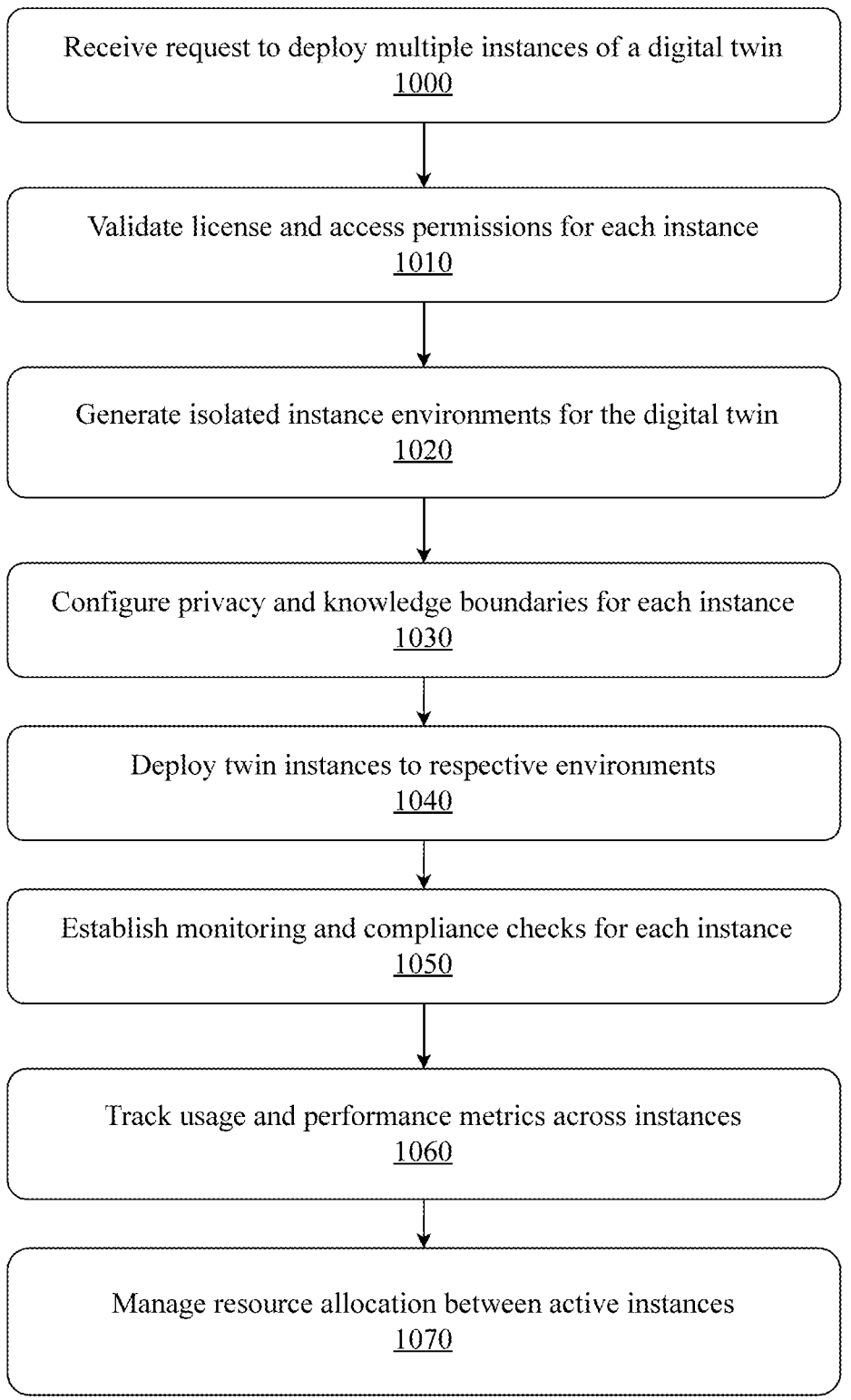

Receive request to deploy multiple instances of a digital twin
1000

Validate license and access permissions for each instance
1010

Generate isolated instance environments for the digital twin
1020

Configure privacy and knowledge boundaries for each instance
1030

Deploy twin instances to respective environments
1040

Establish monitoring and compliance checks for each instance
1050

Track usage and performance metrics across instances
1060

Manage resource allocation between active instances
1070

FIG. 10

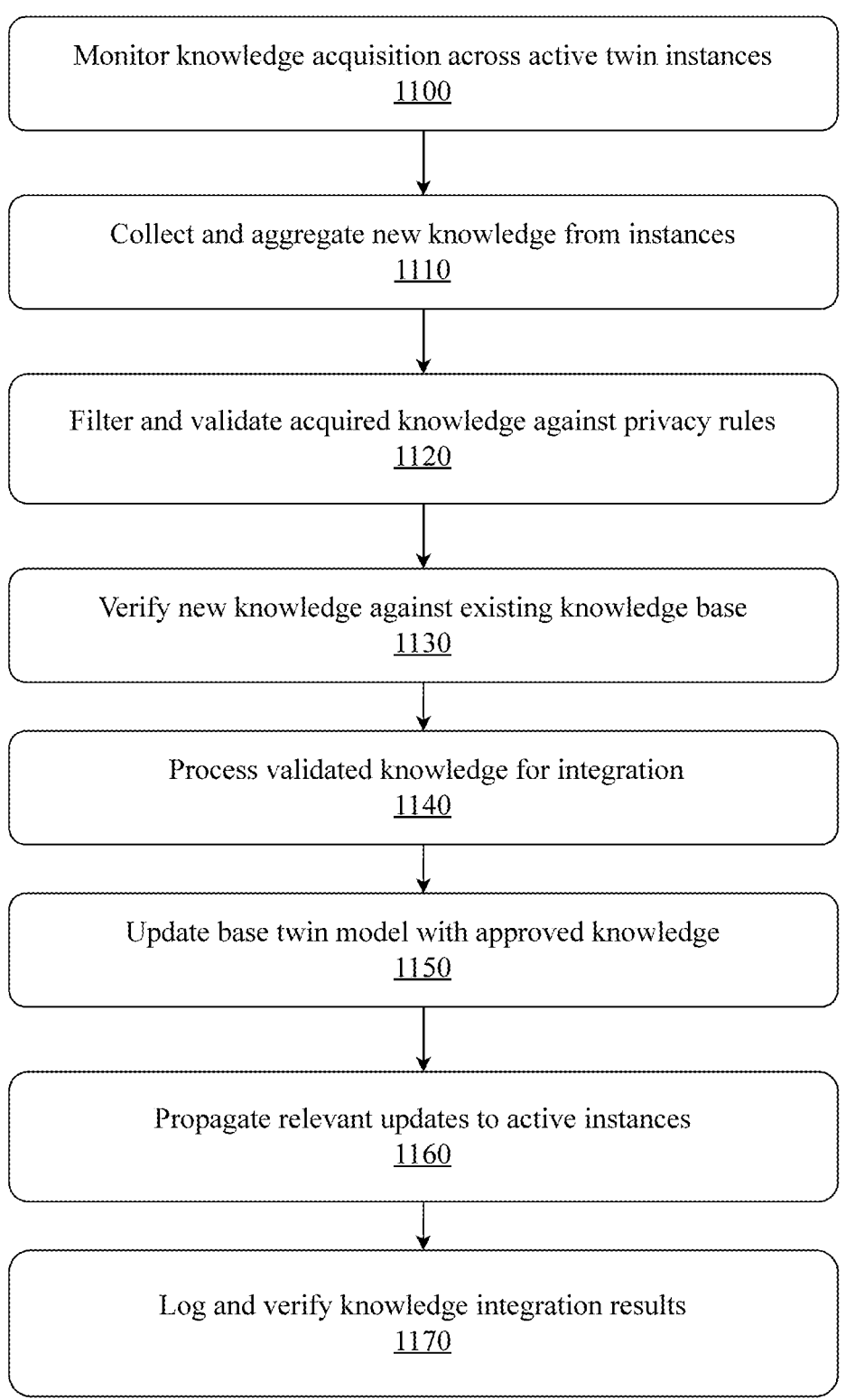

Monitor knowledge acquisition across active twin instances
1100

Collect and aggregate new knowledge from instances
1110

Filter and validate acquired knowledge against privacy rules
1120

Verify new knowledge against existing knowledge base
1130

Process validated knowledge for integration
1140

Update base twin model with approved knowledge
1150

Propagate relevant updates to active instances
1160

Log and verify knowledge integration results
1170

FIG. 11

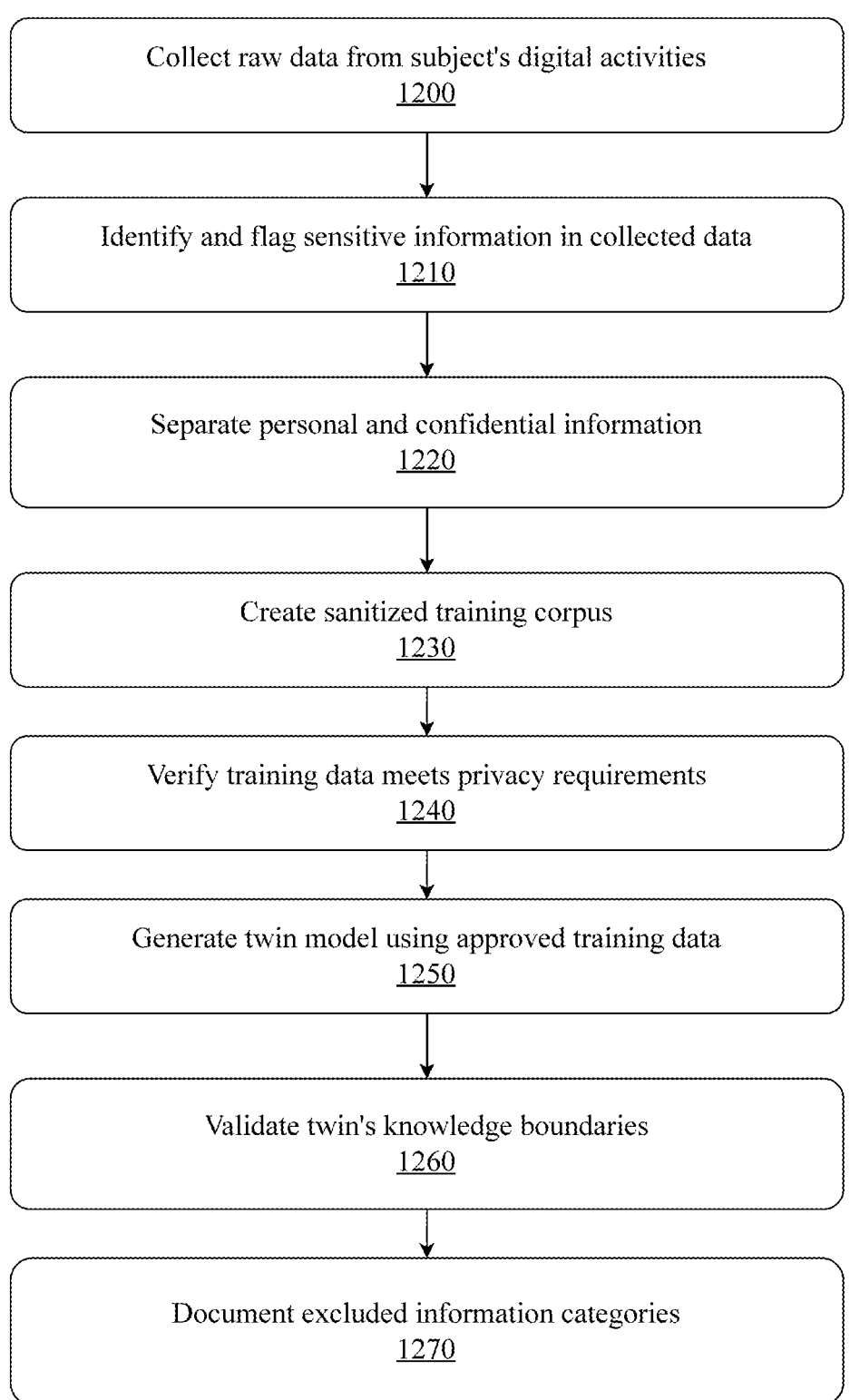

Collect raw data from subject's digital activities
1200

Identify and flag sensitive information in collected data
1210

Separate personal and confidential information
1220

Create sanitized training corpus
1230

Verify training data meets privacy requirements
1240

Generate twin model using approved training data
1250

Validate twin's knowledge boundaries
1260

Document excluded information categories
1270

FIG. 12

PLATFORM FOR DIGITALLY TWINNING SUBJECTS INTO AI AGENTS

CROSS-REFERENCE TO RELATED APPLICATIONS

Priority is claimed in the application data sheet to the following patents or patent applications, each of which is expressly incorporated herein by reference in its entirety:
Ser. No. 19/006,533
Ser. No. 18/407,415

BACKGROUND OF THE INVENTION

Field of the Art

The present invention relates to automated digital replication of human expertise, and more particularly to scalable platforms that enable the creation, management, and deployment of AI-powered digital twins that capture and emulate domain expert knowledge, decision-making processes, and interaction patterns through continuous behavioral monitoring and analysis.

Discussion of the State of the Art

The rapid advancement of artificial intelligence and machine learning technologies has created new opportunities for capturing and replicating human expertise in digital form. Traditional approaches to knowledge capture and transfer typically rely on manual documentation, training programs, and apprenticeship models, which are time-consuming, inconsistent, and often fail to capture the full depth of an expert's knowledge and decision-making processes. These limitations become particularly apparent in fields requiring deep domain expertise, such as wealth management, legal counsel, and specialized technical consulting.

Current methods for preserving and transferring expert knowledge suffer from several critical limitations. While existing systems may successfully record basic information and explicit knowledge, they typically lack sophisticated mechanisms for capturing tacit knowledge, behavioral patterns, and the nuanced decision-making processes that characterize true expertise. This becomes particularly problematic when organizations need to scale their expert services, maintain consistency across multiple locations, or preserve critical knowledge when key personnel depart.

Most existing knowledge management systems rely on static documentation and structured databases, leading to significant loss of context and experiential knowledge. These systems often fail to capture the dynamic nature of expert decision-making, resulting in rigid and incomplete representations of human expertise. Furthermore, current platforms typically lack robust mechanisms for maintaining the privacy of sensitive information while still enabling the effective transfer of relevant knowledge.

Conventional approaches to digital representation of expertise frequently employ simplified models that cannot adequately replicate the complexity of human decision-making and interaction styles. These systems often struggle to maintain consistency with the original expert's approach while adapting to new situations and contexts. Additionally, existing platforms typically lack sophisticated mechanisms for managing the ethical considerations, privacy requirements, and intellectual property rights associated with digital representations of human expertise.

What is needed is a comprehensive platform capable of creating and managing digital twins of human experts while maintaining high levels of fidelity, privacy, and ethical compliance. Such a platform should be capable of efficiently capturing both explicit and tacit knowledge, replicating natural interaction patterns, and managing the complex rights and permissions associated with digital expert representations. Furthermore, the platform should support sophisticated data collection mechanisms, advanced behavioral modeling, and robust privacy protection to enable secure and scalable deployment of expert digital twins across multiple contexts and organizations.

SUMMARY OF THE INVENTION

Accordingly, the inventor has conceived and reduced to practice, a platform for digitally twinning subjects into AI agents. Digital expert twinning revolutionizes how organizations capture, preserve, and scale their human expertise by creating AI-powered digital representations of key personnel that can operate independently across multiple contexts. Through a system that continuously monitors expert behavior, communication patterns, and decision-making processes, the platform builds comprehensive digital twins that maintain the knowledge, problem-solving capabilities, and interaction styles of the original subjects. These twins can be licensed and deployed across various organizations, enabling parallel access to expert-level guidance while maintaining strict privacy and confidentiality boundaries. The system's advanced instance management capabilities allow each twin deployment to learn and adapt to its specific context while contributing validated knowledge back to the base model, ensuring continuous improvement without compromising security.

The platform fundamentally transforms knowledge distribution by enabling simultaneous deployment of digital experts across multiple use cases and organizations. Rather than limiting expertise to one-to-one interactions, organizations can now provide consistent expert-level guidance to multiple users simultaneously. Each twin instance maintains appropriate privacy boundaries and confidentiality requirements while operating within its defined domain of expertise. The system's sophisticated compliance monitoring and privacy enforcement ensure that sensitive information remains protected even as valuable expertise is shared and utilized at scale.

The technology introduces novel approaches to expertise monetization through its comprehensive licensing and rights management system. Original experts can license their digital twins to multiple organizations while maintaining control over their knowledge and receiving appropriate compensation. Organizations acquiring these twins benefit from immediate access to expert-level capabilities without the traditional constraints of human availability or geographic location. The platform's instance-level learning capabilities ensure that each deployment can adapt to specific needs while maintaining consistency with the original expert's knowledge and approach.

Beyond simple knowledge transfer, the platform enables dynamic expertise evolution through its sophisticated learning and integration mechanisms. As twin instances interact with users and encounter new scenarios, they can acquire and validate new knowledge, which can be selectively integrated back into the base model after rigorous privacy and compliance screening. This creates a continuous improvement cycle where expertise grows and evolves while maintaining the original expert's core knowledge and decision-making patterns. The system's ability to manage multiple learning instances while maintaining privacy and consistency opens new possibilities for scalable expertise development and distribution.

According to a preferred embodiment, A computing system for a platform for digitally twinning subjects into AI agents, the computing system comprising: one or more hardware processors configured for: collecting a plurality of data pertaining to a selected person; processing the plurality of data into a plurality of models representing various aspects of the selected person, wherein the various aspects includes at least behaviors and knowledge base; training an AI agent generating model on the plurality of models for a plurality of selected people; processing the plurality of models pertaining to the selected person through a trained AI generating model, wherein the AI generating model generates a digital twin of the selected person; storing the digital twin in a digital twin database; licensing a plurality of digital twins from the digital twin database to a plurality of users; and monitoring the use of each licensed digital twin to ensure that each digital twin complies with an established scope of knowledge and privacy is disclosed.

According to a preferred embodiment, A computer-implemented method for a platform for digitally twinning subjects into AI agents, the computer-implemented method comprising the steps of: collecting a plurality of data pertaining to a selected person; processing the plurality of data into a plurality of models representing various aspects of the selected person, wherein the various aspects includes at least behaviors and knowledge base; training an AI agent generating model on the plurality of models for a plurality of selected people; processing the plurality of models pertaining to the selected person through a trained AI generating model, wherein the AI generating model generates a digital twin of the selected person; storing the digital twin in a digital twin database; licensing a plurality of digital twins from the digital twin database to a plurality of users; and monitoring the use of each licensed digital twin to ensure that each digital twin complies with an established scope of knowledge and privacy, is disclosed.

According to a preferred embodiment, A system for a platform for digitally twinning subjects into AI agents, comprising one or more computers with executable instructions that, when executed, cause the system to: collect a plurality of data pertaining to a selected person; process the plurality of data into a plurality of models representing various aspects of the selected person, wherein the various aspects includes at least behaviors and knowledge base; train an AI agent generating model on the plurality of models for a plurality of selected people; process the plurality of models pertaining to the selected person through a trained AI generating model, wherein the AI generating model generates a digital twin of the selected person; store the digital twin in a digital twin database; license a plurality of digital twins from the digital twin database to a plurality of users; and monitor the use of each licensed digital twin to ensure that each digital twin complies with an established scope of knowledge and privacy, is disclosed

BRIEF DESCRIPTION OF THE DRAWING FIGURES

FIG. 9 is a flow diagram illustrating an exemplary method for digitally twinning subjects into AI agents.

FIG. 10 is a flow diagram illustrating an exemplary method for operating multiple instances of the same digital twin using a platform for digitally twinning subjects into AI agents.

FIG. 11 is a flow diagram illustrating an exemplary method for retraining digital twins from instance learning using a platform for digitally twinning subjects into AI agents.

FIG. 12 is a flow diagram illustrating an exemplary method for training digital twinning models on privacy aware data using a platform for digitally twinning subjects into AI agents

DETAILED DESCRIPTION OF THE INVENTION

Figure 1:
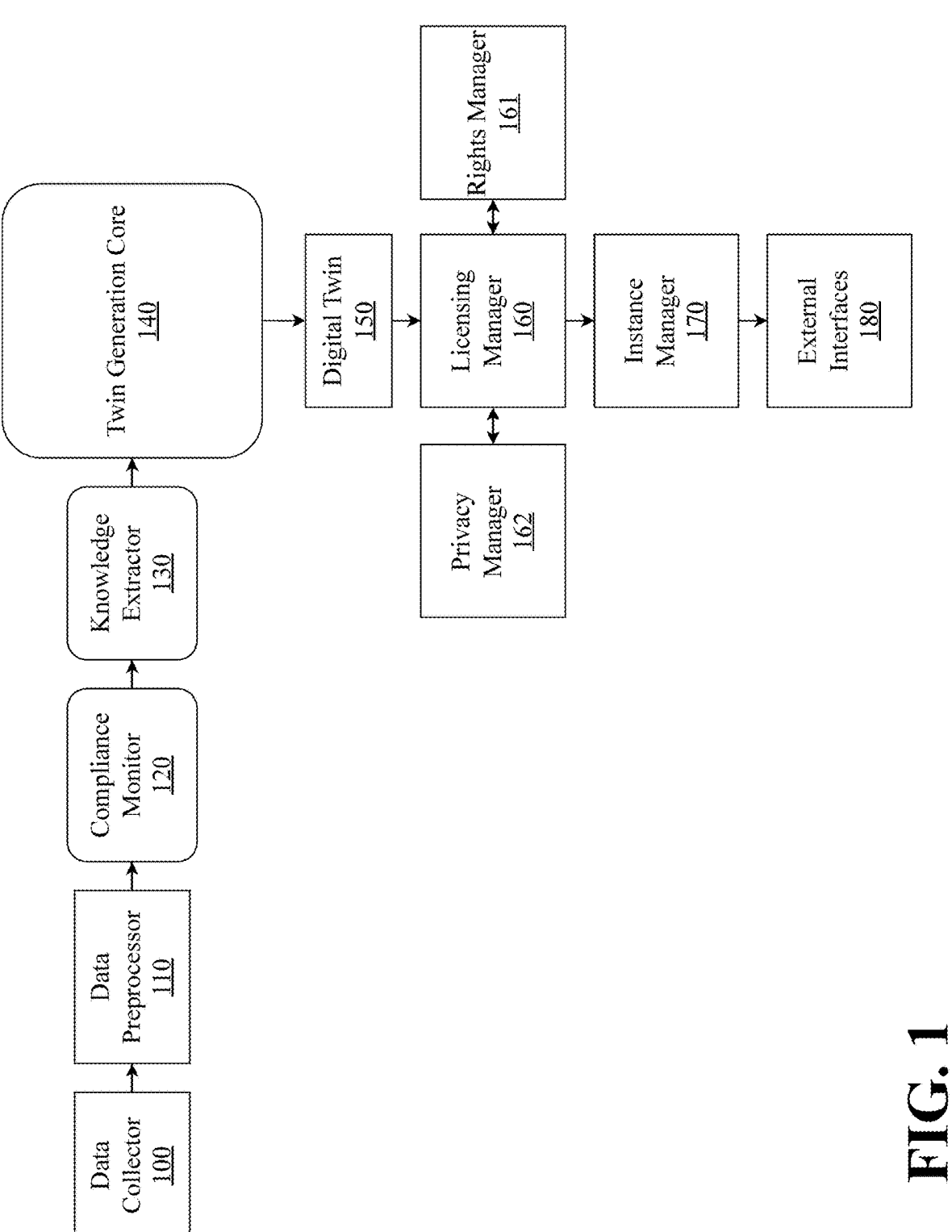
FIG. 1 is a block diagram illustrating an exemplary system architecture for a platform for digitally twinning subjects into AI agents.

The inventor has conceived and reduced to practice a platform for digitally twinning subjects into AI agents.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "digital twin" refers to an AI-powered digital representation that captures, replicates, and emulates the knowledge, expertise, decision-making processes, communication patterns, and behavioral characteristics of a human subject within defined domains of expertise. A digital twin is created through automated continuous monitoring and analysis of the subject's digital interactions, communications, work patterns, and decision processes using a data collection system. Digital twins maintains the ability to evolve and update based on ongoing observation of the subject's activities while preserving privacy boundaries and confidentiality requirements. Such a twin can operate independently or as part of a network of digital twins, each maintaining isolated knowledge domains and access controls. A digital twin may incorporate various types of captured data including, but not limited to, screen recordings, keystroke patterns, communication transcripts, document access patterns, decision trees, professional network interactions, and temporal work patterns. A digital twin platform can have varying levels of fidelity and specialization based on the depth and breadth of captured data and the specific domain expertise being replicated.

Conceptual Architecture

FIG. 1 is a block diagram illustrating an exemplary system architecture for a platform for digitally twinning subjects into AI agents. The system begins with a data collector 100 which implements automated behavioral monitoring capabilities to capture expert interactions across digital platforms. This includes but is not limited to screen recordings, keystroke patterns, document access, communication styles, and decision-making processes. The captured data flows to a data preprocessor 110 that formats and organizes the raw information for analysis.

A compliance monitor 120 screens the processed data to identify and filter sensitive information, ensuring that personal and confidential material is appropriately handled before knowledge extraction. The knowledge extractor 130 then analyzes the filtered data to identify patterns, expertise, and decision-making frameworks that characterize the expert's capabilities within their domain.

Take for examples, digitally twinning a senior tax strategist. When a senior tax strategist agrees to be digitally twinned, data collector 100 begins comprehensive data collection across multiple dimensions of their professional activities. In the digital workspace, the system captures how they navigate tax preparation software, documenting their workflow patterns when handling complex returns. It records their research methods in tax law databases, noting which sources they prioritize and how they cross-reference regulations. The system monitors their document creation patterns, from how they structure complex tax opinions to their approach in drafting client advisories about tax law changes.

Communication monitoring captures their client interaction style through various channels. This includes but is not limited to recording and analyzing client consultation calls, noting how they explain complex tax concepts to different audience levels, from individual taxpayers to corporate CFOs. Their email communications are analyzed to understand their written communication patterns, professional terminology usage, and how they structure formal tax opinions. The system also captures their internal communications with colleagues, showing how they collaborate on complex cases and mentor junior staff.

Decision-making patterns are captured through screen recording and interaction logging. This includes tracking how they approach tax planning scenarios, noting which variables they consider first, how they weigh different options, and their risk assessment methods. The system observes their problem-solving sequences when dealing with complex international tax issues, estate planning, or corporate restructuring scenarios.

The data preprocessor 110 then organizes this raw data into structured formats. For example, client conversations are transcribed and categorized by topic (e.g., corporate taxation, estate planning, international tax law), while screen recordings are processed to identify common workflow patterns and decision points. The system tags and classifies different types of tax strategies, compliance approaches, and risk assessment methods.

Compliance monitor 120 then begins its work of filtering sensitive information. It identifies and removes specific client data, such as tax ID numbers, financial accounts, and personal financial details. It also flags and filters confidential corporate information, such as proprietary business structures or pending merger details, while preserving the underlying tax strategy knowledge.

A knowledge extractor 130 then processes this filtered data to build a comprehensive model of the tax expert's expertise. It identifies patterns in how they approach different tax scenarios, their methods for optimizing tax positions, and their strategies for ensuring compliance while maximizing client benefits. The system maps out their decision trees for various tax situations, understanding how they adjust strategies based on changing regulations or client circumstances.

This process creates a rich knowledge base that captures not just what the tax expert knows, but how they apply their knowledge in practice. The resulting digital twin can replicate their approach to tax strategy, their method of explaining complex concepts, and their systematic problem-solving style, all while maintaining strict privacy and confidentiality boundaries. This allows organizations to scale their tax expertise across multiple locations while maintaining consistent high-quality tax advisory services.

A twin generation core 140 uses the extracted knowledge to create a digital twin 150, incorporating the expert's knowledge, behavior patterns, and communication style while maintaining appropriate privacy boundaries. This digital twin serves as the base model from which instances can be created and deployed.

A licensing manager 160 works in conjunction with the rights manager 161 and privacy manager 162 to control the distribution and use of digital twins. Licensing manager 160 handles deployment permissions and usage tracking, while rights manager 161 ensures appropriate revenue sharing with original experts and maintains intellectual property controls. Privacy manager 162 enforces confidentiality boundaries and access controls across all twin deployments.

An instance manager 170 oversees the deployment and operation of multiple twin instances across different environments, maintaining isolation between instances while enabling appropriate knowledge sharing and learning capabilities. External interfaces 180 provide secure access points for users and systems to interact with deployed twin instances, including but not limited to APIs, user interfaces, and integration capabilities.

This architecture enables organizations to capture expert knowledge, create privacy-aware digital twins, and deploy them at scale while maintaining appropriate controls and compliance requirements. For example, a financial institution could create a digital twin of their top tax advisor, deploy instances to multiple branches, and maintain consistent expert-level guidance while ensuring client confidentiality and regulatory compliance.

Figure 2:
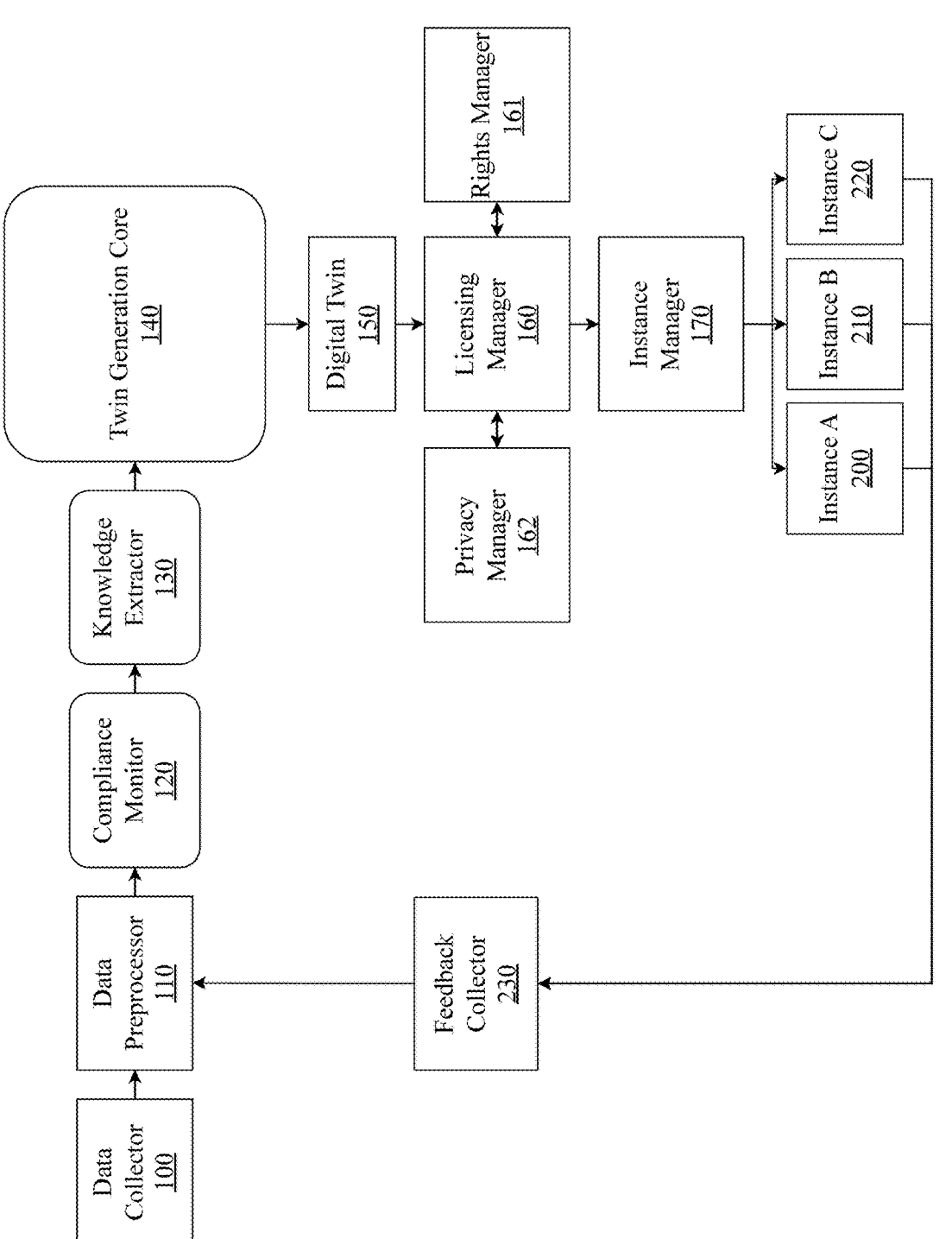
FIG. 2 is a block diagram illustrating an exemplary architecture for a platform for digitally twinning subjects into AI agents that hosts multiple instances of a digital twin across multiple devices.

FIG. 2 is a block diagram illustrating an exemplary architecture for a platform for digitally twinning subjects into AI agents that hosts multiple instances of a digital twin across multiple devices. An instance manager 170 coordinates the deployment and operation of multiple twin instances (instance A 200, instance B 210, and instance C 220), each operating in isolated environments with their own privacy and compliance boundaries. For example, a digital twin of a wealth management expert might have separate instances deployed across different financial institutions, each maintaining client confidentiality while providing consistent expert guidance.

In one embodiment, a feedback collector 230 aggregates learning and adaptations from deployed instances. As instances interact with users and encounter new scenarios, they acquire new knowledge and expertise. Feedback collector 230 monitors these developments, filters them for privacy and compliance through data preprocessor 110, and feeds validated improvements back to twin generation core 140. For instance, if an instance learns a new tax regulation interpretation that proves valuable, this knowledge can be verified and incorporated into the base model for all future deployments.

The system is capable of maintaining strict isolation between instances if necessary while enabling selective knowledge sharing. Privacy manager 162 and compliance monitor 120 ensure that instance-specific confidential information remains protected while allowing beneficial knowledge to be shared across the platform. This architecture enables organizations to benefit from collective learning while maintaining appropriate privacy and compliance boundaries. For example, if multiple instances of a legal expert twin encounter similar case patterns in different jurisdictions, the system can aggregate these insights while protecting client confidentiality.

This figure demonstrates how the platform enables scalable deployment of expertise while maintaining security and enabling continuous improvement through monitored instance learning. The feedback loop ensures that digital twins can evolve and improve over time, similar to how human experts develop their knowledge through experience, while maintaining the original expert's core knowledge and decision-making patterns.

Figure 3:
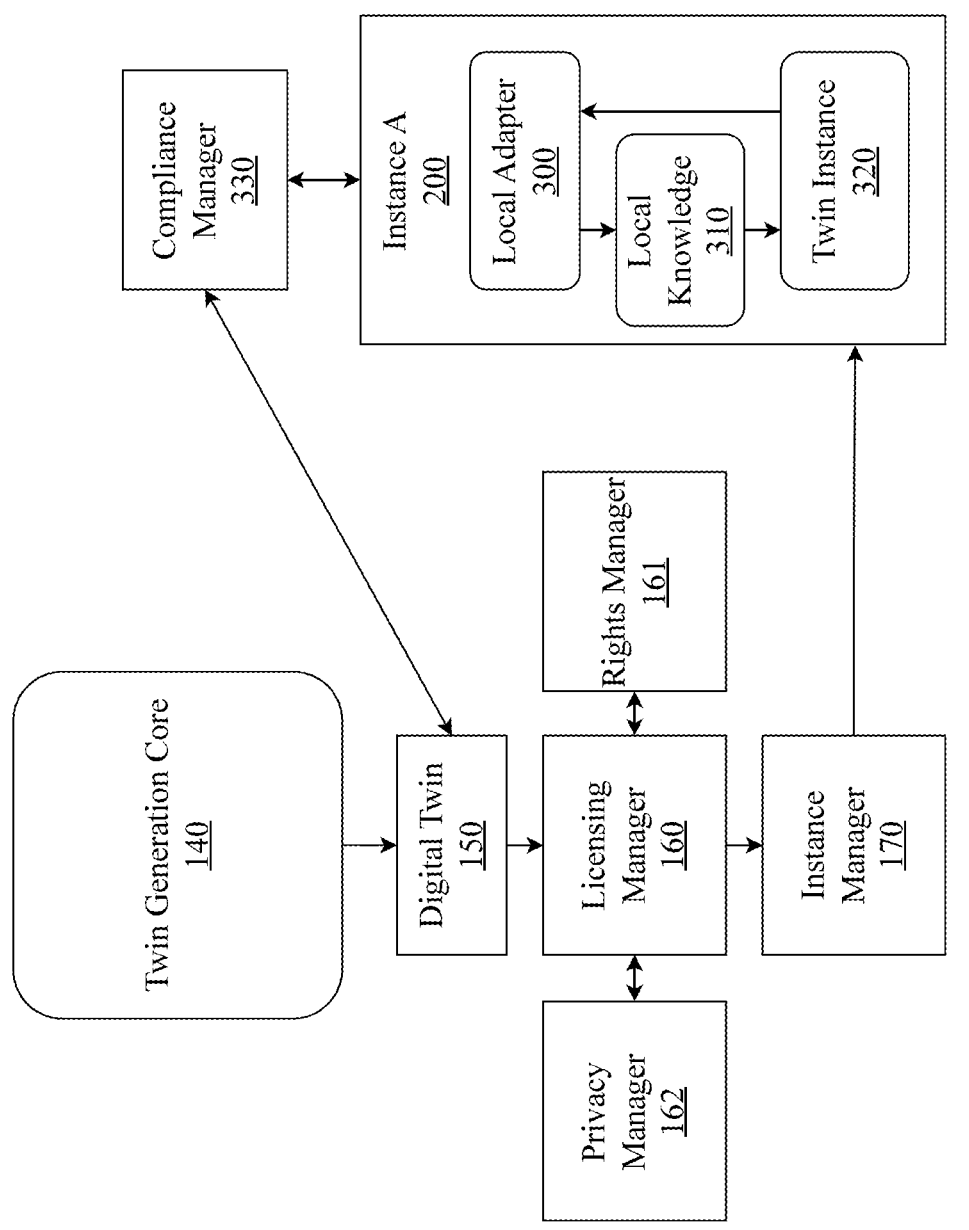
FIG. 3 is a block diagram illustrating an exemplary architecture for a platform for digitally twinning subjects into AI agents where AI agents learn at the instance level and can incorporate acquired knowledge into training subsequent AI agents.

FIG. 3 is a block diagram illustrating an exemplary architecture for a platform for digitally twinning subjects into AI agents where AI agents learn at the instance level and can incorporate acquired knowledge into training subsequent AI agents. The twin generation core 140 creates the base digital twin 150, which serves as the foundation for deployed instances. When deployed through the instance manager 170, each instance (represented by instance A 200)

incorporates several key components that enable localized operation and learning. The local adapter 300 serves as the instance's learning interface, processing new experiences and information encountered during operation. For example, if a digital twin of a medical specialist encounters a novel case presentation, the local adapter processes this experience for potential learning.

The local knowledge 310 component maintains instance-specific information and adaptations, storing knowledge that may be unique to the particular deployment environment. This might include institution-specific protocols or regional variations in practice. The twin instance 320 represents the operational twin that interacts with users, incorporating both the base knowledge from the digital twin 150 and locally adapted knowledge.

A dedicated compliance manager 330 oversees the instance's operations, working in conjunction with the privacy manager 162 and rights manager 161 to ensure that all adaptations and operations remain within established boundaries. For example, if a legal expert twin instance learns new case law interpretations, the compliance manager ensures this knowledge acquisition doesn't breach client confidentiality or cross jurisdictional boundaries.

This architecture enables each instance to function semi-autonomously while maintaining appropriate controls and connections to the broader system. The licensing manager 160 continues to monitor and control instance usage, while the instance-level components enable personalization and adaptation to specific deployment contexts. This structure supports the platform's ability to maintain consistent expert-level performance while allowing for contextual adaptation and learning within secured boundaries.

This architecture enables flexibility in how digital twins can be deployed and adapted across different contexts while maintaining strict control over privacy and compliance boundaries. Consider a tax expert twin deployed across multiple accounting firms: one instance might develop specialized knowledge in tech startup taxation in Silicon Valley, while another adapts to handle complex agricultural tax situations in the Midwest. Each instance maintains the core tax expertise and decision-making patterns of the original expert but develops additional contextual knowledge specific to its deployment environment.

The local adapter 300 plays a large role in this adaptation process, functioning as a sophisticated learning interface that carefully processes and evaluates new information encountered during operation. When a twin instance encounters a novel situation—such as a new type of cryptocurrency transaction or an unusual international tax scenario—the local adapter assesses the situation, determines its potential value for learning, and processes it according to established privacy and compliance rules. This allows instances to grow more effective over time while maintaining appropriate boundaries.

The instance-level knowledge management system, centered around the local knowledge 310 component, maintains a careful balance between shared expertise and instance-specific learning. For example, in a legal context, one instance might develop expertise in California corporate law while another specializes in New York securities regulations. The system maintains these separate knowledge bases while still allowing approved insights to be shared across instances when appropriate. This might occur when a novel tax strategy is developed that could be valuable across multiple jurisdictions, or when a new compliance approach is discovered that could benefit all instances.

Compliance manager 330 implements monitoring and control mechanisms that operate at multiple levels. At the instance level, it ensures that each twin operates within its defined scope and maintains appropriate privacy boundaries. At the system level, it manages knowledge sharing between instances and prevents unauthorized information transfer. For example, if a wealth management twin learns specific investment strategies from working with high-net-worth clients, the compliance manager ensures that any shared insights are properly anonymized and generalized before being made available to other instances.

The interaction between local and global knowledge management creates a learning ecosystem. When multiple instances encounter similar situations in different contexts—such as medical twins dealing with treatment protocols across different hospitals, or legal twins handling contract negotiations in different industries—the system can identify patterns and extract valuable insights while maintaining strict privacy controls. This enables the platform to evolve and improve over time while ensuring that each instance remains true to its original expert's approach and maintains appropriate professional boundaries.

This architectural approach enables organizations to achieve large scale in deploying expertise while maintaining consistency and quality. Each instance benefits from both the core expertise of the original expert and the collective learning of the entire system, all while operating within carefully defined boundaries that protect privacy and ensure compliance with professional and regulatory requirements. The result is a system that can effectively scale expert knowledge across multiple contexts while maintaining the nuanced decision-making and professional judgment that characterizes true expertise.

The platform's management of multiple instances also enables new approaches to expertise sharing and development. Organizations can deploy twins with different specialization patterns, allowing them to develop deep expertise in specific areas while maintaining broad capability across their entire domain. This creates a network effect where each instance's learning potentially benefits the entire system, while strict privacy and compliance controls ensure that sensitive information remains protected.

Figure 4:
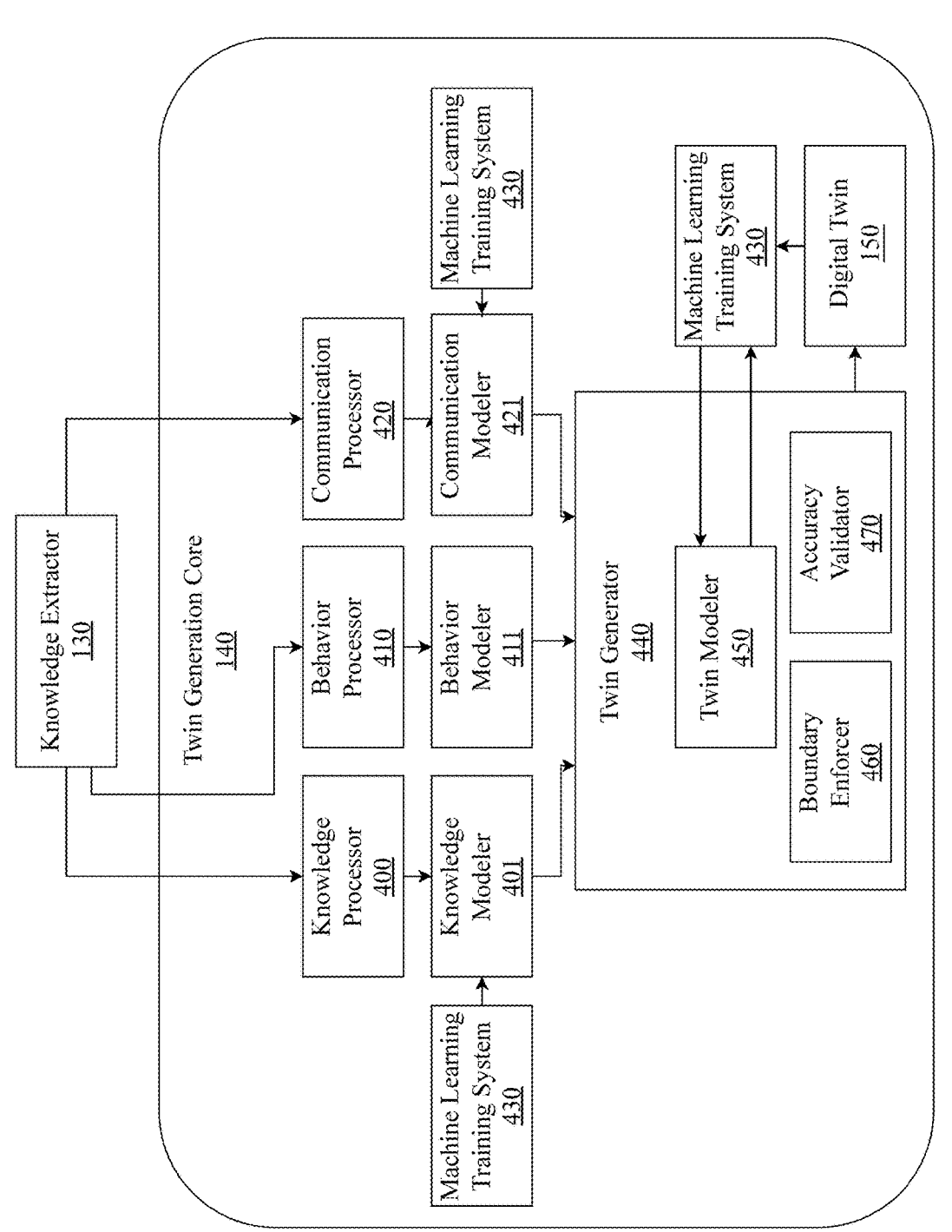
FIG. 4 is a block diagram illustrating an exemplary component of a platform for digitally twinning subjects into AI agents, a twin generation core. Knowledge extractor 130 feeds information into three parallel processing streams within the twin generation core.

FIG. 4 is a block diagram illustrating an exemplary component of a platform for digitally twinning subjects into AI agents, a twin generation core. A knowledge processor 400 analyzes domain expertise and technical knowledge, while a behavior processor 410 examines decision-making patterns and problem-solving approaches. Simultaneously, a communication processor 420 analyzes interaction styles and communication patterns. For example, when creating a digital twin of a medical specialist, the system would process their diagnostic knowledge, decision-making patterns in treatment selection, and their approach to patient communication.

Each processor feeds into corresponding modelers (knowledge modeler 401, behavior modeler 411, and communication modeler 421) that create structured representations of each aspect. These modelers work in conjunction with the machine learning training system 430, which provides advanced modeling capabilities for each domain. For instance, the knowledge modeler might create semantic networks of medical knowledge, while the behavior modeler captures the expert's diagnostic decision trees.

A twin generator 440 integrates these models through its twin modeler 450, creating a cohesive digital twin that combines all aspects of the expert's capabilities. The boundary enforcer 460 ensures the twin operates within defined privacy and confidentiality limits, while the accuracy validator 470 verifies that the twin's responses align with the original expert's capabilities. For example, if creating a digital twin of a financial advisor, the boundary enforcer would ensure the twin doesn't disclose client information, while the accuracy validator confirms that investment advice aligns with the expert's methodology.

The machine learning training system 430 appears at multiple points in the architecture, providing continuous learning and optimization capabilities throughout the twin generation process. This enables the system to refine and improve the digital twin's capabilities while maintaining consistency with the original expert's knowledge and approach. The result is a digital twin 150 that effectively replicates the expert's capabilities while operating within appropriate boundaries and maintaining high accuracy standards.

The twin generation core represents a multi-stream processing architecture that transforms raw expert data into a cohesive, functional digital twin. Through its parallel processing streams, the system captures and models not just what an expert knows, but how they think and communicate, creating a comprehensive digital representation of their professional capabilities.

Knowledge processor 400 may employ an advanced natural language processing and semantic analysis to understand and structure domain expertise. For a tax expert, this might involve analyzing thousands of tax opinions, research notes, and advisory documents to build a comprehensive map of their technical knowledge. The system identifies key concepts, relationships, and hierarchies within their expertise— for instance, understanding how they interpret tax code interactions or approach complex international tax structures. This processed knowledge forms the foundation of the twin's technical capabilities.

Operating in parallel, behavior processor 410 analyzes the expert's decision-making patterns and problem-solving approaches through sophisticated pattern recognition algorithms. For a medical specialist, this might involve analyzing how they prioritize symptoms during diagnosis, their risk assessment patterns in treatment selection, or their approach to balancing multiple treatment options. The system captures nuanced aspects of professional judgment—for instance, how they adjust their approach based on patient history or how they handle uncertainty in diagnostic information.

Communication processor 420 employs advanced linguistic analysis to capture the expert's interaction patterns and communication style. This includes analyzing tone, terminology usage, and explanation strategies across different contexts. For example, how a legal expert adapts their communication style when explaining complex legal concepts to different audiences—from fellow attorneys to non-specialist clients. The system captures these nuances to ensure the twin can maintain appropriate and effective communication across various professional contexts.

Each of these processors feeds into specialized modelers that create structured representations of the expert's capabilities. Knowledge modeler 401 builds sophisticated semantic networks and knowledge graphs that represent not just individual facts but complex relationships and dependencies within the expert's knowledge domain. Behavior modeler 411 creates detailed decision trees and action patterns that capture the expert's professional judgment and problem-solving strategies. Communication modeler 421 develops adaptive communication frameworks that enable the twin to maintain appropriate and effective interaction styles across different contexts and audience types.

Twin generator 440 represents synthesis of these separate models into a coherent digital twin that can blend knowledge, behavior, and communication. This integration process ensures that the twin's responses reflect not just accurate knowledge, but appropriate decision-making patterns and communication styles. For instance, when a medical twin provides treatment recommendations, it considers not just medical knowledge, but also demonstrates the careful reasoning and clear communication style characteristic of the original expert.

A boundary enforcer 460 and an accuracy validator 470 work together to maintain appropriate operational limits while ensuring high-quality performance. Boundary enforcer 460 implements privacy protection mechanisms that go beyond simple data filtering—it understands context-dependent privacy requirements and can adapt its restrictions based on the specific deployment environment. Accuracy validator 470 employs advanced validation techniques to ensure the twin's responses maintain consistency with the original expert's approach, checking not just factual accuracy but also reasoning patterns and professional judgment.

The machine learning training system 430 presence throughout the architecture enables sophisticated continuous learning capabilities. This system can identify and incorporate new knowledge while maintaining the expert's characteristic approach to problem-solving and communication. For example, a legal twin might learn about new case law while maintaining consistent reasoning patterns and professional judgment in how it applies this new knowledge.

This architecture enables the creation of digital twins that not only possess deep domain expertise but can also demonstrate the nuanced judgment and effective communication that characterize true expert performance. The result is a digital twin that can provide expert-level guidance while maintaining appropriate professional boundaries and consistent high-quality performance across various deployment contexts.

Figure 5:
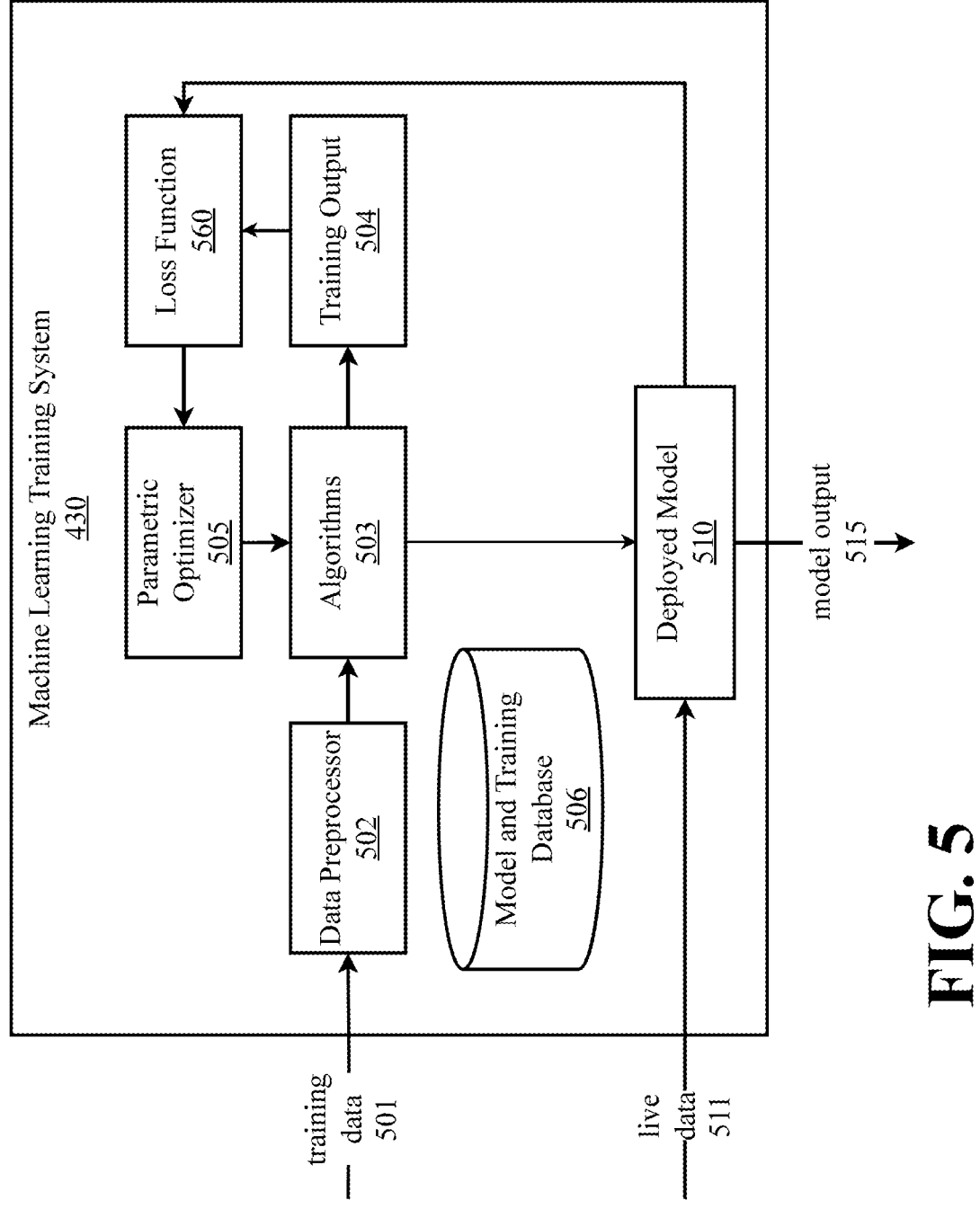
FIG. 5 is a block diagram illustrating an exemplary component of a platform for digitally twinning subjects into AI agents, a machine learning training system.

FIG. 5 is a block diagram illustrating an exemplary component of a platform for digitally twinning subjects into AI agents, a machine learning training system. According to the embodiment, the machine learning training system 430 may comprise a model training stage comprising a data preprocessor 502, one or more machine and/or deep learning algorithms 503, training output 504, and a parametric optimizer 505, and a model deployment stage comprising a deployed and fully trained model 510 configured to perform tasks described herein such as processing subject information into a digital twin. In one embodiment, machine learning training system 430 may be used to train a plurality of machine learning modelers.

At the model training stage, a plurality of training data 501 may be received by the machine learning training system 450. Data preprocessor 502 may receive the input data (e.g., subject screen recording data, conversation data, browser data, research history) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 502 may also be configured to create training dataset, a validation dataset, and a test set from the plurality of input data 501. For example, a training dataset may comprise 80% of the preprocessed input data, the validation set 10%, and the test dataset may comprise the remaining 10% of the data. The preprocessed training dataset may be fed as input into one or more machine and/or deep learning algorithms 503 to train a predictive model for object monitoring and detection.

During model training, training output 504 is produced and used to measure the accuracy and usefulness of the predictive outputs. During this process a parametric optimizer 505 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by the machine learning training system 430 to evaluate a model's performance. Metrics can include, but are not limited to, word error rate (WER), word information loss, speaker identification accuracy (e.g., single stream with multiple speakers), inverse text normalization and normalization error rate, punctuation accuracy, timestamp accuracy, latency, resource consumption, custom vocabulary, sentence-level sentiment analysis, multiple languages supported, cost-to-performance tradeoff, and personal identifying information/payment card industry redaction, to name a few. In one embodiment, the system may utilize a loss function 560 to measure the system's performance. The loss function 560 compares the training outputs with an expected output and determined how the algorithm needs to be changed in order to improve the quality of the model output. During the training stage, all outputs may be passed through the loss function 160 on a continuous loop until the algorithms 503 are in a position where they can effectively be incorporated into a deployed model 515.

The test dataset can be used to test the accuracy of the model outputs. If the training model is establishing correlations that satisfy a certain criterion such as but not limited to quality of the correlations and amount of restored lost data, then it can be moved to the model deployment stage as a fully trained and deployed model 510 in a production environment making predictions based on live input data 511 (e.g., subject screen recording data, conversation data, browser data, research history). Further, model correlations and restorations made by deployed model can be used as feedback and applied to model training in the training stage, wherein the model is continuously learning over time using both training data and live data and predictions. A model and training database 506 is present and configured to store training/test datasets and developed models. Database 506 may also store previous versions of models.

According to some embodiments, the one or more machine and/or deep learning models may comprise any suitable algorithm known to those with skill in the art including, but not limited to: LLMs, generative transformers, transformers, supervised learning algorithms such as:

regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 503 may comprise a deep learning algorithm such as neural networks (e.g., recurrent, convolutional, long short-term memory networks, etc.).

In some implementations, the machine learning training system 430 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 506.

Figure 6:
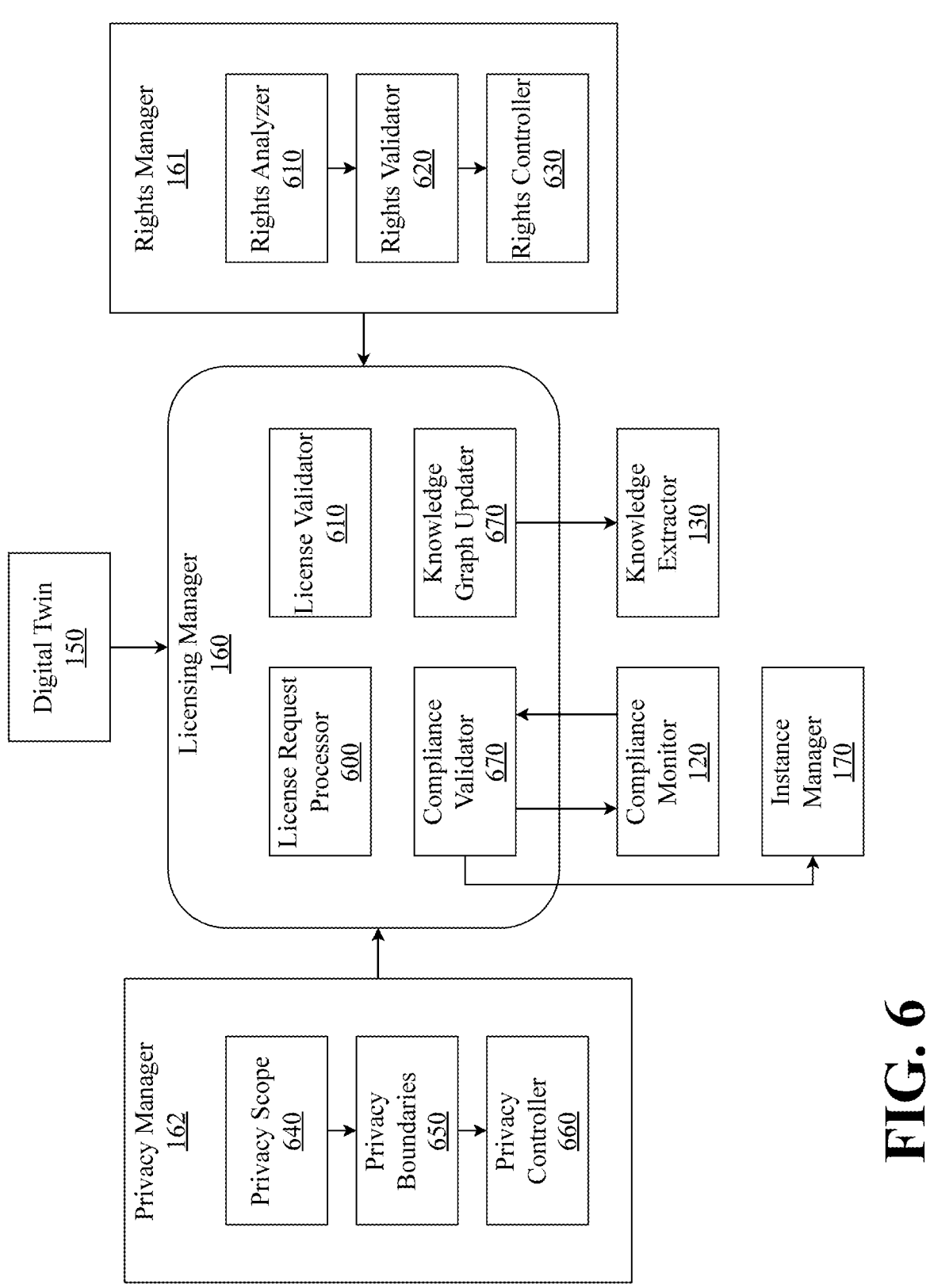
FIG. 6 is a block diagram illustrating an exemplary component of a platform for digitally twinning subjects into AI agents, a licensing manager.

FIG. 6 is a block diagram illustrating an exemplary component of a platform for digitally twinning subjects into AI agents, a licensing manager. The licensing manager 160 serves as the central control point, processing licensing requests through a license request processor 600 and license validator 610. These components work together to evaluate and authorize twin deployments based on established criteria. For example, when a financial institution requests a digital twin of a tax expert, these components verify licensing terms and deployment permissions.

A privacy manager 162 implements a three-tier privacy control system. A privacy scope 640 defines the permissible information boundaries, while privacy boundaries 650 establish specific operational limits. A privacy controller 660 actively enforces these restrictions. For instance, in a medical expert twin, the privacy scope might limit access to patient information, while privacy boundaries prevent cross-institutional data sharing. A rights manager 161 employs a similar tiered approach with a rights analyzer 610, rights validator 620, and rights controller 630 working in concert to manage intellectual property and usage rights. This ensures appropriate revenue sharing with original experts and maintains usage restrictions across deployments.

In one embodiment, the knowledge graph updater 670 may be integrated with the compliance validator 670 and knowledge extractor 130. This integrated system enables dynamic knowledge updates while maintaining privacy and compliance requirements. For example, when a legal expert twin learns new case interpretations, these components ensure the knowledge can be safely integrated without breaching client confidentiality.

A compliance monitor 120 works with instance manager 170 to oversee deployed twins, ensuring they maintain appropriate boundaries while enabling beneficial knowledge sharing. This comprehensive architecture enables the platform to scale expert knowledge deployment while maintaining strict privacy, rights management, and compliance controls throughout the system's operation. The licensing and rights management architecture of the digital twin platform implements a sophisticated system for controlling deployment, ensuring privacy, managing rights, and enabling secure knowledge sharing across multiple instances. This complex system balances the needs of various stakeholders while maintaining strict control over sensitive information and intellectual property.

Licensing manager 160 functions as an intelligent control center for managing twin deployments across various organizations and contexts. Through license request processor 600, it handles complex deployment scenarios—for instance, when a national accounting firm wants to deploy tax expert twins across multiple offices, each with different specialization needs. The license validator 610 implements sophisticated validation protocols that go beyond simple permission checking, considering factors such as geographic restrictions, usage volumes, specialization requirements, and interaction limitations. For example, when deploying a medical expert twin across a hospital network, the system can enforce different access levels and capabilities based on department needs and staff credentials.

Privacy manager 162 implements a three-tier architecture that provides granular control over information access and usage. Privacy scope 640 establishes fundamental information boundaries based on multiple factors including professional requirements, regulatory obligations, and contractual agreements. Privacy boundaries 650 create context-specific operational limits that can adapt to different deployment environments. Privacy controller 660 actively monitors and enforces these restrictions in real-time, using advanced pattern recognition to identify and prevent potential privacy violations before they occur.

For instance, in a legal context, the privacy scope might establish broad categories of protected information (client data, case strategies, settlement details), while privacy boundaries define specific operational limits for different practice areas or jurisdictions. The privacy controller then actively manages these boundaries during operation—for example, ensuring that a twin deployed in corporate law practice doesn't inadvertently share insights derived from protected client information when providing guidance on similar cases.

Rights manager 161 implements an equal approach to intellectual property and usage rights management. Rights analyzer 610 continuously evaluates twin usage patterns and knowledge application to ensure appropriate attribution and compensation. Rights validator 620 verifies compliance with usage agreements and monitors for potential intellectual property conflicts. Rights controller 630 actively manages access and usage restrictions, ensuring that twins operate within their licensed scope while maintaining appropriate revenue sharing with original experts.

This system enables complex revenue sharing models that can account for various usage patterns and knowledge contributions. For example, when a tax expert twin develops new strategies through interaction with users, the system can attribute this innovation appropriately and adjust revenue sharing accordingly. Similarly, when multiple expert twins collaborate on complex cases, the system can properly allocate credit and compensation for the insights generated.

Knowledge graph updater 670 allows for managing dynamic knowledge evolution while maintaining privacy and compliance. Working in concert with the compliance validator and knowledge extractor 130, it enables digital twins to learn and evolve while ensuring all new knowledge adheres to established privacy and compliance requirements. This system employs analysis techniques to identify valuable insights that can be safely shared across instances while protecting sensitive information.

For example, when a medical expert twin learns new treatment approaches through interaction with specialists, the system can extract the generalizable medical knowledge while carefully removing any patient-specific information. Similarly, when a legal twin develops new case strategy insights, the system can separate valuable legal reasoning from protected client information.

Compliance monitor 120 and instance manager 170 work together to maintain this balance across all deployed instances. They implement continuous monitoring and adaptive control mechanisms that ensure each instance maintains appropriate boundaries while enabling beneficial knowledge sharing. This might involve managing how tax strategy insights are shared across different jurisdictions, or how medical treatment approaches are adapted for different healthcare settings.

This comprehensive architecture enables organizations to scale expert knowledge deployment while maintaining strict control over privacy, rights, and compliance. The system's management of multiple instances and knowledge sharing creates a platform that can evolve and improve over time while protecting sensitive information and ensuring appropriate compensation for intellectual property contributions.

Figure 7:
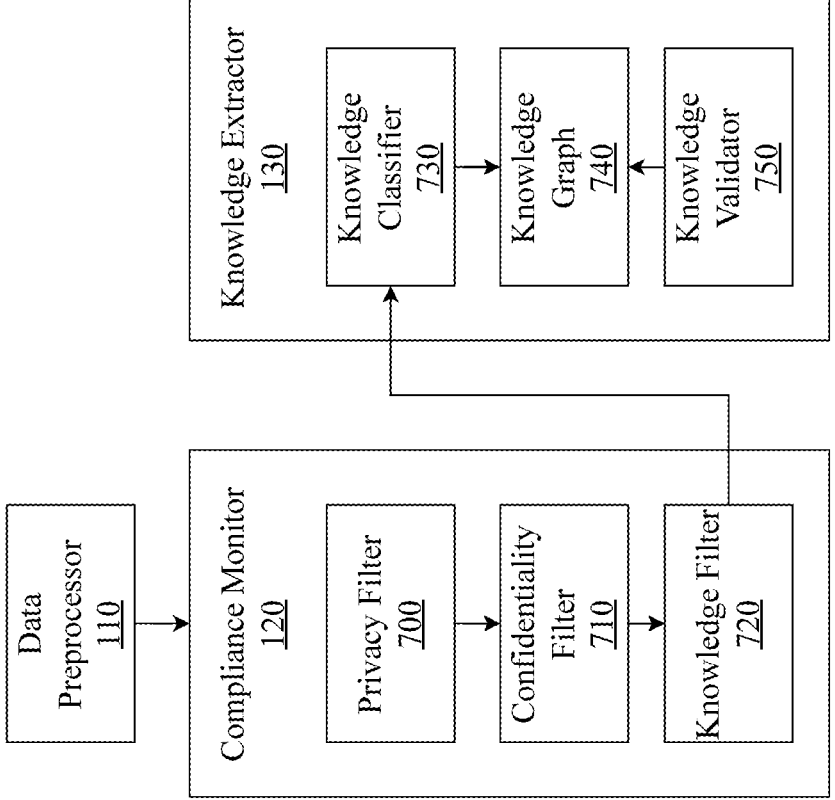
FIG. 7 is a block diagram illustrating exemplary components of a platform for digitally twinning subjects into AI agents, a compliance monitor and a knowledge extractor.

FIG. 7 is a block diagram illustrating exemplary components of a platform for digitally twinning subjects into AI agents, a compliance monitor and a knowledge extractor. The process begins at the data preprocessor 110, which feeds information into a multi-stage compliance monitoring system. The compliance monitor 120 implements three sequential filtering stages. First, a privacy filter 700 identifies and removes personal information, such as identifying details about clients or patients. The confidentiality filter 710 then screens for sensitive business or organizational information, such as proprietary processes or trade secrets. Finally, the knowledge filter 720 determines which remaining information is suitable for twin training while maintaining appropriate boundaries.

Knowledge extractor 130 processes the filtered information through several components. A knowledge classifier 730 categorizes and organizes the approved information into appropriate domains and subtopics. For example, in a medical expert twin, this might separate diagnostic knowledge from treatment protocols. The knowledge graph 740 structures this information into an interconnected network of expertise, establishing relationships between different knowledge elements. A knowledge validator 750 verifies the accuracy and completeness of the knowledge graph, ensuring it maintains consistency with the original expert's capabilities while respecting privacy and confidentiality boundaries.

This architecture ensures that the resulting knowledge graph contains only appropriate, validated information that can be safely used in twin generation and deployment. For instance, a legal expert's twin would maintain comprehensive knowledge of case law and legal principles while excluding any confidential client information or private legal strategies. The system's staged filtering approach enables the platform to create highly capable digital twins while maintaining strict privacy and compliance standards.

Figure 8:
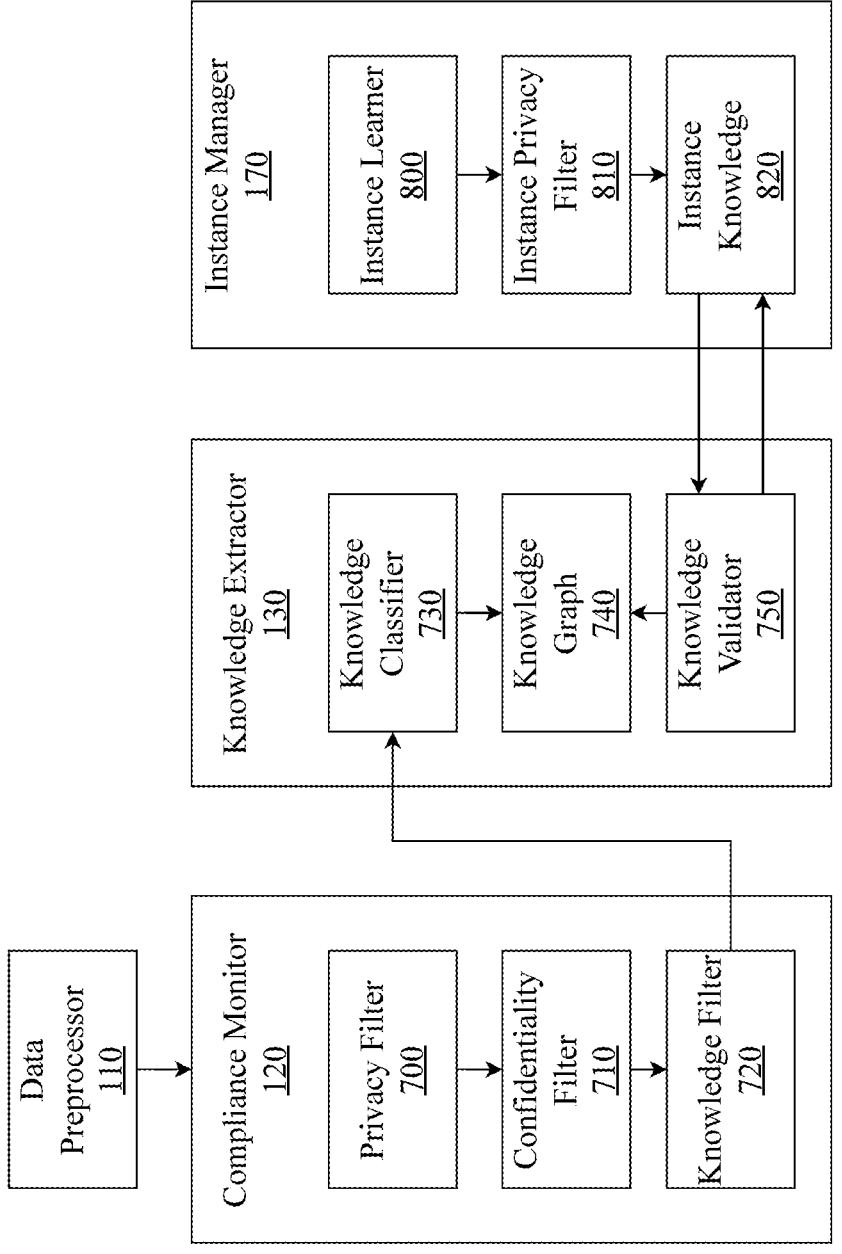
FIG. 8 is a block diagram illustrating exemplary components of a platform for digitally twinning subjects into AI agents, a compliance monitor and a knowledge extractor, wherein the knowledge extractor incorporate knowledge learned at the instance level by deployed digital twins.

FIG. 8 is a block diagram illustrating exemplary components of a platform for digitally twinning subjects into AI agents, a compliance monitor and a knowledge extractor, wherein the knowledge extractor incorporate knowledge learned at the instance level by deployed digital twins. The diagram maintains the core privacy-aware knowledge processing pipeline from data preprocessor 110 through compliance monitor 120 and its filtering stages (privacy filter 700, confidentiality filter 710, and knowledge filter 720). Similarly, knowledge extractor 130 continues to manage the knowledge classifier 730, knowledge graph 740, and knowledge validator 750 as described in FIG. 7.

The key addition in this figure is the instance manager 170 subsystem, which enables deployed twins to learn and evolve. The instance learner 800 captures new knowledge acquired during twin operation, such as when a medical expert twin encounters novel case presentations or treatment outcomes. This learned information passes through the instance privacy filter 810, which applies privacy and confidentiality rules specific to the deployment context. For example, a wealth management twin's learned insights would be screened to remove client-specific details.

The instance knowledge 820 component stores validated learning that has passed privacy screening. This component maintains a bidirectional relationship with the knowledge validator 750, enabling the system to verify new knowledge against existing expertise while allowing validated insights to enhance the core knowledge graph 740. For instance, if a legal expert twin learns about new case law interpretations, this knowledge can be validated and integrated into the broader knowledge base while maintaining appropriate privacy boundaries.

This architecture enables digital twins to learn and adapt within their specific deployment contexts while ensuring that valuable knowledge can be safely shared across the platform. The system maintains strict privacy controls while enabling continuous improvement of both individual instances and the overall knowledge base.

DETAILED DESCRIPTION OF EXEMPLARY ASPECTS

FIG. 9 is a flow diagram illustrating an exemplary method for digitally twinning subjects into AI agents. In a first step 900, a plurality of data pertaining to a selected person is collected through automated monitoring systems. This step utilizes a data collection system to capture digital interactions, communications, and work patterns from the subject's professional activities. For example, when creating a digital twin of a medical specialist, the system would collect their screen interactions, communication patterns, and decision-making processes during patient consultations. In a step 910, the collected data is processed into various models representing different aspects of the selected person. This step employs multiple specialized processors to create distinct models of the subject's knowledge, behavior patterns, and communication style. The system separates and structures these different aspects to enable more effective training of the digital twin.

In a step 920, an AI agent generating model is trained using the various models representing the selected person. This step involves using machine learning systems to create a comprehensive understanding of how the subject's different characteristics work together. The training process incorporates privacy and compliance boundaries to ensure appropriate knowledge scope. In a step 930, the models pertaining to the selected person are processed through the AI agent generating model. This step validates and refines the models, ensuring they accurately represent the subject's expertise while maintaining privacy and confidentiality requirements.

In a step 940, a digital twin of the selected person is generated based on the processed models. This step creates an AI-powered representation that combines the subject's knowledge, decision-making patterns, and communication style into a coherent digital expert system. In a step 950, the digital twin is stored in a digital twin database for future deployment. This step ensures the twin is properly maintained and can be accessed for multiple deployments while maintaining version control and update capabilities.

In step 960, a plurality of digital twins from the digital twin database are licensed to a plurality of users. This step manages the distribution of twins across different organizations while maintaining appropriate access controls and usage rights. In step 970, the use of each licensed digital twin is monitored to ensure compliance with established scope of knowledge and privacy requirements. This step provides ongoing oversight to maintain appropriate boundaries and ensure twins operate within their defined parameters across all deployments FIG. 10 is a flow diagram illustrating an exemplary method for operating multiple instances of the same digital twin using a platform for digitally twinning subjects into AI agents. In a first step 1000, the system receives a request to deploy multiple instances of a digital twin. This step initiates the multi-instance deployment process when organizations need to utilize the same expert twin across different contexts. For example, a financial institution might request multiple instances of a tax expert twin for different regional offices. In a step 1010, the system validates license and access permissions for each instance. This step ensures that the deployment request complies with licensing terms and that each intended environment has appropriate authorization. The validation process checks factors such as usage limits, geographical restrictions, and access levels.

In a step 1020, the system generates isolated instance environments for the digital twin. This step creates separate operational spaces for each twin instance, ensuring that knowledge and interactions remain properly segregated. Each environment is configured with its own secure boundaries to prevent unauthorized data sharing between instances.

In a step 1030, privacy and knowledge boundaries are configured for each instance. This step establishes specific operational parameters based on the deployment context. For example, instance-specific privacy rules might be set to handle different jurisdictional requirements or organizational policies. In a step 1040, twin instances are deployed to their respective environments. This step activates the configured instances in their designated operational spaces, making them available for user interaction while maintaining their defined boundaries and restrictions.

In a step 1050, monitoring and compliance checks are established for each instance. This step implements continuous oversight mechanisms to ensure instances operate within their defined parameters and maintain appropriate privacy and security standards throughout their operation. In a step 1060, usage and performance metrics are tracked across instances. This step monitors how each instance is being utilized and how well it performs its functions, enabling optimization and improvement while maintaining consistency with the original expert's capabilities. In a step 1070, resource allocation between active instances is managed. This step ensures efficient distribution of computational resources and maintains optimal performance across all deployed instances, adjusting allocations based on usage patterns and demand.

FIG. 11 is a flow diagram illustrating an exemplary method for retraining digital twins from instance learning using a platform for digitally twinning subjects into AI agents. In a first step 1100, the system monitors knowledge acquisition across active twin instances. This step continuously tracks how deployed twins learn and adapt through their interactions. For example, observing how a medical expert twin learns from new case presentations or treatment outcomes across different hospital deployments.

In step 1110, new knowledge is collected and aggregated from instances. This step gathers and organizes the learned information from all active deployments, creating a structured repository of potential knowledge updates. For instance, collecting new tax interpretation strategies learned by multiple instances of a tax expert twin. In step 1120, acquired knowledge is filtered and validated against privacy rules. This step screens the collected information to ensure it doesn't contain sensitive or confidential data. For example, removing client-specific details from wealth management strategies while preserving the general approach.

In step 1130, new knowledge is verified against the existing knowledge base. This step checks for consistency and compatibility with the twin's current expertise, ensuring that new knowledge aligns with established principles and practices. For instance, validating that newly learned legal interpretations don't conflict with existing precedents. In step 1140, validated knowledge is processed for integration. This step prepares approved knowledge for incorporation into the twin's knowledge base, structuring it appropriately for the system's knowledge graph and learning models.

In step 1150, the base twin model is updated with approved knowledge. This step incorporates the validated knowledge into the core twin model, enhancing its capabilities while maintaining consistency with the original expert's approach. In step 1160, relevant updates are propagated to active instances. This step distributes approved knowledge improvements to deployed twins, ensuring all instances benefit from validated learning while maintaining their specific operational boundaries. In step 1170, knowledge integration results are logged and verified. This step documents the update process and confirms successful implementation across all affected instances, maintaining a clear audit trail of knowledge evolution.

FIG. 12 is a flow diagram illustrating an exemplary method for training digital twinning models on privacy aware data using a platform for digitally twinning subjects into AI agents. In step a first 1200, raw data is collected from the subject's digital activities using a data collection system. This step captures comprehensive digital interactions, including screen recordings, communications, and work patterns. For example, recording how a legal expert researches cases, drafts documents, and communicates with clients.

In a step 1210, sensitive information is identified and flagged in the collected data. This step uses privacy detection algorithms to mark potentially sensitive content, such as client names, personal identifiers, or confidential business information within the expert's work patterns. In a step 1220, personal and confidential information is separated from the general knowledge corpus. This step categorizes and isolates different types of sensitive information, ensuring that private data can be properly handled. For instance, separating a financial advisor's general investment strategies from specific client portfolio details.

In a step 1230, a sanitized training corpus is created by removing or anonymizing sensitive information while preserving valuable expertise. This step produces a clean dataset that maintains the expert's knowledge and decision-making patterns without compromising privacy or confidentiality. In a step 1240, the training data is verified against privacy requirements to ensure compliance. This step applies multiple validation checks to confirm that all sensitive information has been properly handled and that the remaining data meets privacy standards and regulatory requirements.

In a step 1250, the twin model is generated using the approved training data. This step creates the AI model that will power the digital twin, incorporating only validated, privacy-compliant information to replicate the expert's capabilities. In a step 1260, the twin's knowledge boundaries are validated to ensure appropriate limitations. This step confirms that the twin operates within defined parameters and cannot inadvertently expose sensitive information or exceed its intended scope of expertise. In a step 1270, excluded information categories are documented for future reference. This step maintains a comprehensive record of what types of information were removed or restricted, ensuring transparency and enabling proper management of the twin's capabilities and limitations.

Figure 13:
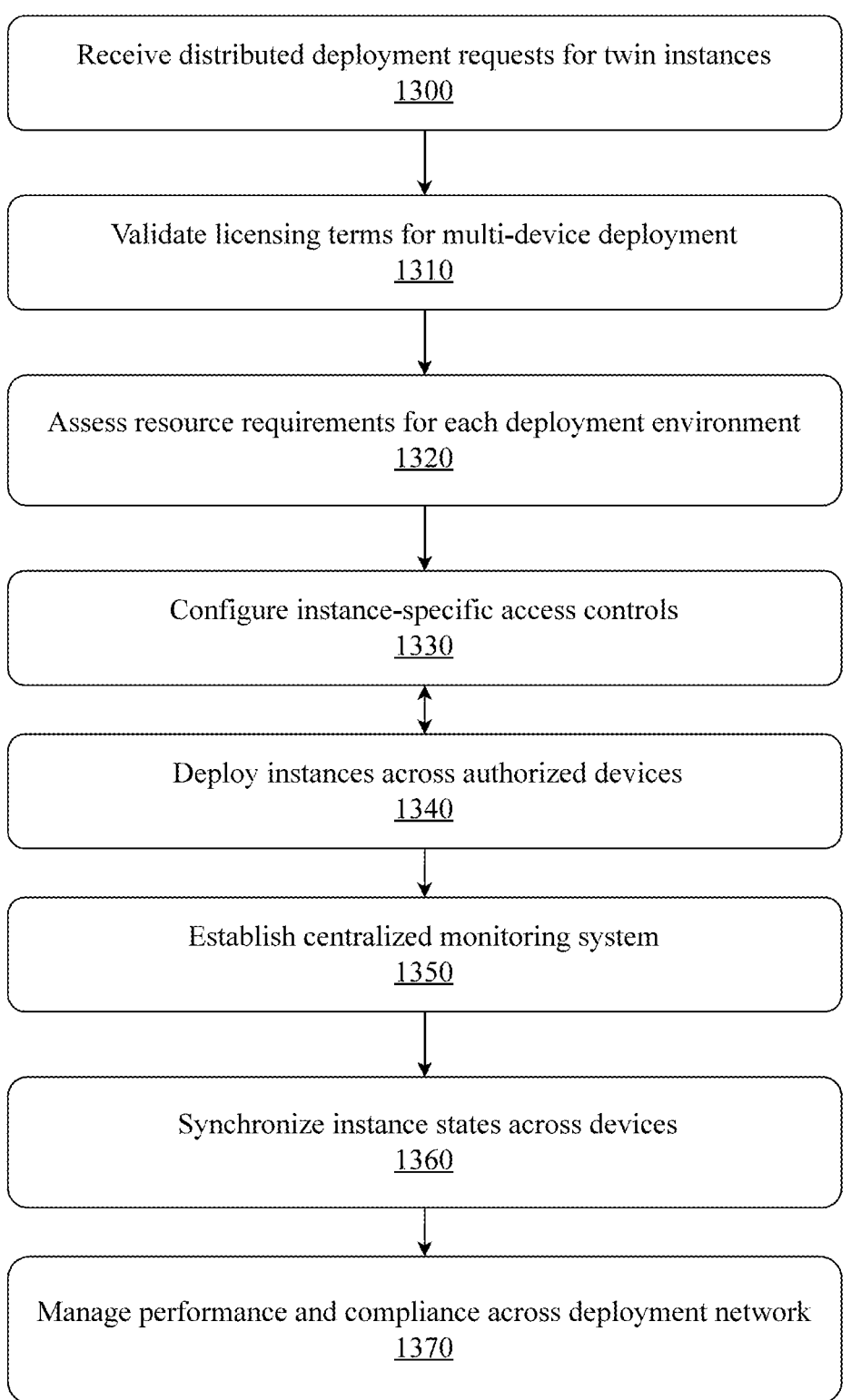
FIG. 13 is a flow diagram illustrating an exemplary method for managing multi-device instances of a platform for digitally twinning subjects into AI agents.

FIG. 13 is a flow diagram illustrating an exemplary method for managing multi-device instances of a platform for digitally twinning subjects into AI agents. In a first step 1300, distributed deployment requests for twin instances are received across multiple devices or locations. This step handles incoming requests for deploying the same digital twin across different physical or virtual environments. For example, when a healthcare network requests twin deployments across multiple facilities.

In a step 1310, licensing terms for multi-device deployment are validated to ensure compliance. This step verifies that the requested deployment pattern falls within the licensed usage rights, checking factors such as number of instances, geographic restrictions, and concurrent user limits. In a step 1320, resource requirements are assessed for each deployment environment. This step evaluates the computational, storage, and network resources needed for each instance to operate effectively in its specific deployment context. For instance, determining hardware requirements for different hospital systems.

In a step 1330, instance-specific access controls are configured based on local requirements. This step establishes appropriate security boundaries and user access levels for each deployment environment, ensuring that each instance operates within its authorized scope. In a step 1340, instances are deployed across authorized devices according to the validated configuration. This step handles the actual installation and activation of twin instances across the distributed network, ensuring proper initialization in each environment.

In a step 1350, a centralized monitoring system is established to oversee all deployed instances. This step implements unified oversight capabilities to track performance, usage, and compliance across the entire deployment network. In a step 1360, instance states are synchronized across devices to maintain consistency. This step ensures that approved knowledge and updates are properly distributed while maintaining appropriate isolation between instances. In a step 1370, performance and compliance are managed across the deployment network. This step provides ongoing oversight of the distributed system, ensuring all instances maintain appropriate performance levels and operate within established boundaries.

Exemplary Computing Environment

Figure 14:
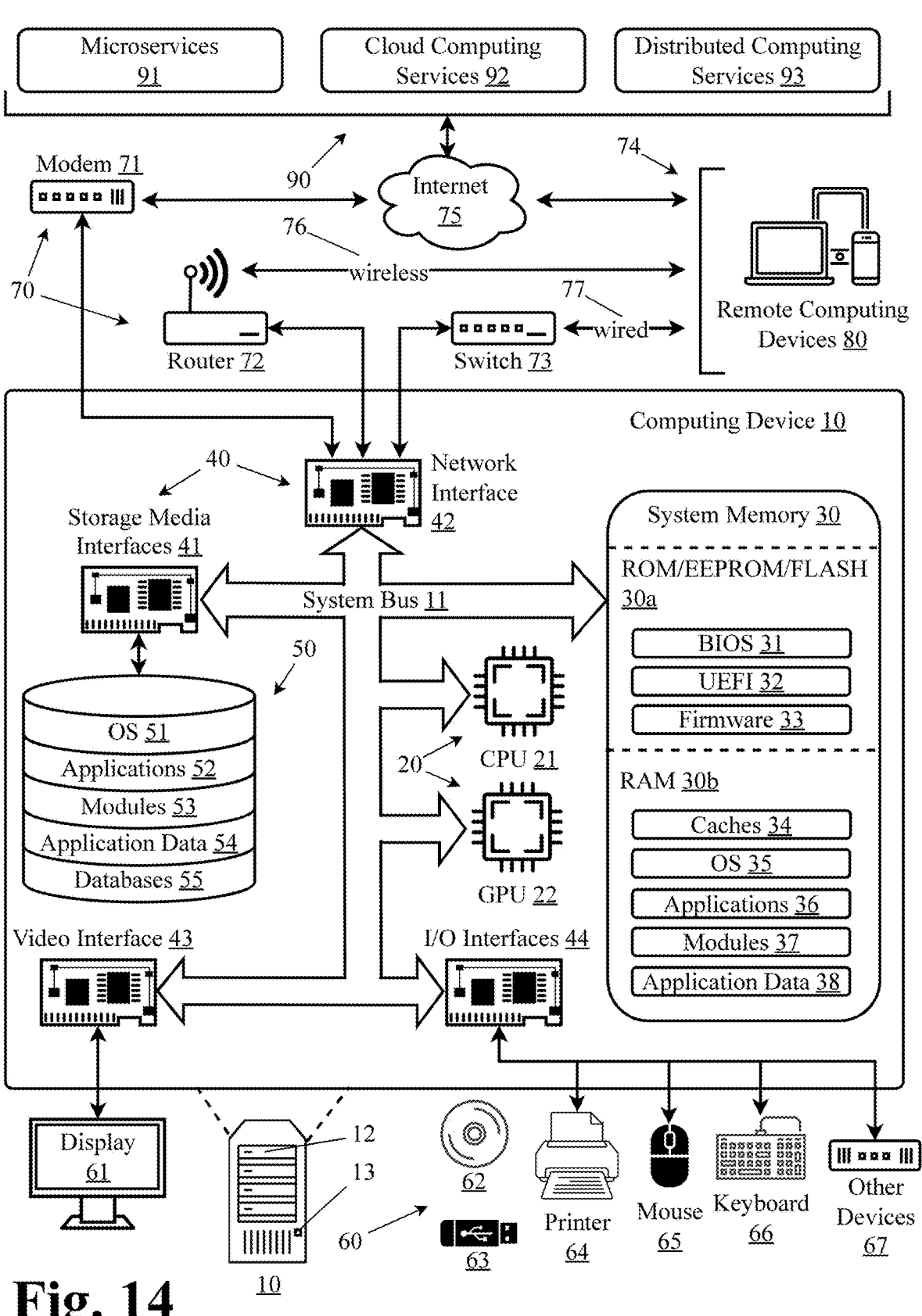
FIG. 14 illustrates an exemplary computing environment on which an embodiment described herein may be implemented.

FIG. 14 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost.

Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computing system for a platform for digitally twinning subjects into AI agents, the computing system comprising:

one or more hardware processors configured for:

collecting a plurality of data pertaining to a selected person;

processing the plurality of data into a plurality of models representing various aspects of the selected person, wherein the various aspects include at least behaviors and knowledge base;

training an artificial intelligence (AI) agent generating model on the plurality of models for a plurality of selected people;

processing the plurality of models pertaining to the selected person through a trained AI generating model, wherein the AI generating model generates a digital twin of the selected person;

storing the digital twin in a digital twin database;

licensing a plurality of digital twins from the digital twin database to a plurality of users; and monitoring the use of each licensed digital twin to ensure that each digital twin complies with an established scope of knowledge and privacy.

2. The computing system of claim 1, wherein the plurality of data includes at least behavioral data, communication data, research data, habits, and knowledge data.

3. The computing system of claim 1, wherein the plurality of licensed digital twins can learn new information while being utilized within their corresponding instance.

4. The computing system of claim 3, wherein the new information learned by licensed digital twins is used to train a new iteration of digital twins.

5. The computing system of claim 1, wherein the digital twin of the selected person is continually checked for accuracy and is redeveloped using an updated knowledge graph when inaccuracies are found.

6. A computer-implemented method for a platform for digitally twinning subjects into AI agents, the computer-implemented method comprising the steps of:

collecting a plurality of data pertaining to a selected person;

processing the plurality of data into a plurality of models representing various aspects of the selected person, wherein the various aspects include at least behaviors and knowledge base;

training an artificial intelligence (AI) agent generating model on the plurality of models for a plurality of selected people;

processing the plurality of models pertaining to the selected person through a trained AI generating model, wherein the AI generating model generates a digital twin of the selected person;

storing the digital twin in a digital twin database;

licensing a plurality of digital twins from the digital twin database to a plurality of users; and monitoring the use of each licensed digital twin to ensure that each digital twin complies with an established scope of knowledge and privacy.

7. The computer-implemented method of claim 6, wherein the plurality of data includes at least behavioral data, communication data, research data, habits, and knowledge data.

8. The computer-implemented method of claim 6, wherein the plurality of licensed digital twins can learn new information while being utilized within their corresponding instance.

9. The computer-implemented method of claim 8, wherein the new information learned by licensed digital twins is used to train a new iteration of digital twins.

10. The computer-implemented method of claim 6, wherein the digital twin of the selected person is continually checked for accuracy and is redeveloped using an updated knowledge graph when inaccuracies are found.

11. A system for a platform for digitally twinning subjects into AI agents, comprising one or more computers with executable instructions that, when executed, cause the system to:

collect a plurality of data pertaining to a selected person;

process the plurality of data into a plurality of models representing various aspects of the selected person, wherein the various aspects include at least behaviors and knowledge base;

train an artificial intelligence (AI) agent generating model on the plurality of models for a plurality of selected people;

process the plurality of models pertaining to the selected person through a trained AI generating model, wherein the AI generating model generates a digital twin of the selected person;

store the digital twin in a digital twin database;

license a plurality of digital twins from the digital twin database to a plurality of users; and monitor the use of each licensed digital twin to ensure that each digital twin complies with an established scope of knowledge and privacy.

12. The system of claim 11, wherein the plurality of data includes at least behavioral data, communication data, research data, habits, and knowledge data.

13. The system of claim 11, wherein the plurality of licensed digital twins can learn new information while being utilized within their corresponding instance.

14. The system of claim 12, wherein the new information learned by licensed digital twins is used to train a new iteration of digital twins.

15. The system of claim 11, wherein the digital twin of the selected person is continually checked for accuracy and is redeveloped using an updated knowledge graph when inaccuracies are found.

* * * * *